(12) United States Patent
Chan

(10) Patent No.: US 8,172,137 B1
(45) Date of Patent: *May 8, 2012

(54) AUTHENTICATION WITH NO PHYSICAL IDENTIFICATION DOCUMENT

(76) Inventor: Hark C. Chan, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/040,160

(22) Filed: Mar. 3, 2011

Related U.S. Application Data

(63) Continuation of application No. 12/728,552, filed on Mar. 22, 2010, now Pat. No. 7,900,820, which is a continuation of application No. 11/465,800, filed on Aug. 19, 2006, now Pat. No. 7,699,217.

(60) Provisional application No. 60/712,477, filed on Aug. 31, 2005, provisional application No. 60/729,540, filed on Oct. 25, 2005.

(51) Int. Cl.
*G06K 5/00* (2006.01)

(52) U.S. Cl. ..................................................... 235/380

(58) Field of Classification Search .................. 235/379, 235/380
See application file for complete search history.

(56) References Cited

U.S. PATENT DOCUMENTS

| | | |
|---|---|---|
| 5,650,604 A | 7/1997 | Marcous et al. |
| 5,963,647 A | 10/1999 | Downing et al. |
| 6,088,683 A | 7/2000 | Jalili |
| 6,227,447 B1 | 5/2001 | Campisano |
| 6,339,766 B1 | 1/2002 | Gephart |
| 6,456,984 B1 | 9/2002 | Demoff et al. |
| 6,736,314 B2 | 5/2004 | Cooper et al. |
| 7,062,464 B1 | 6/2006 | Drummond et al. |
| 2002/0035539 A1 | 3/2002 | O'Connell |
| 2002/0069170 A1 | 6/2002 | Rizzo et al. |
| 2002/0123938 A1 | 9/2002 | Yu et al. |
| 2002/0147914 A1 | 10/2002 | Arnold |
| 2003/0022655 A1 | 1/2003 | Bogat |
| 2003/0126083 A1 | 7/2003 | Seifert et al. |
| 2003/0141361 A1 | 7/2003 | Nguyen et al. |
| 2004/0030659 A1 | 2/2004 | Gueh |
| 2004/0049455 A1 | 3/2004 | Mohsenzadel |
| 2004/0088551 A1 | 5/2004 | Dor et al. |
| 2004/0139019 A1 | 7/2004 | Cooper |
| 2004/0254802 A1 | 12/2004 | Miller et al. |
| 2005/0075985 A1 | 4/2005 | Cartmell |
| 2005/0246277 A1 | 11/2005 | Bloem et al. |
| 2005/0268107 A1 | 12/2005 | Harris et al. |
| 2006/0100961 A1 | 5/2006 | Paterno et al. |
| 2009/0150169 A1 | 6/2009 | Kirkwood et al. |
| 2010/0174646 A1 | 7/2010 | Cole et al. |

*Primary Examiner* — Thien M. Le
*Assistant Examiner* — Christle Marshall

(57) ABSTRACT

Authentication of an individual can be performed even when the individual does not have physical identification documents. A person provides a password, a contact number and at least one piece of human generated information to a company. When the person wants to establish identity, he/she first calls an agent of the company. The agent asks the caller questions that include the human generated information. If the agent is satisfied that the caller is the authorized person, the agent sends a code to the caller using the contact number. The caller can use the password and the code to later authenticate himself/herself.

8 Claims, 4 Drawing Sheets

| First code | Readily recallable info | | Contact number | password | money | condition | Second code | status |
|---|---|---|---|---|---|---|---|---|
| A1379 | Mother's maiden name: Smith | Place of birth: Chicago | (408) 356-1357 | ad70 | $1500 | (1) valid 7/1/06 - 7/9/06 (2) wait 20 min. after call to okay money | 1597 | |
| ⋮ | | Name of dog | | | | | | |
| ⋮ | | | | | | | | |

Fig. 3

AUTHENTICATION WITH NO PHYSICAL IDENTIFICATION DOCUMENT

CROSS REFERENCE TO RELATED APPLICATION(S)

This application is a continuation of U.S. application Ser. No. 12/728,552 filed Mar. 22, 2010, now U.S. Pat. No. 7,900,820 which is a continuation of U.S. application Ser. No. 11/465,800 filed Aug. 19, 2006, now U.S. Pat. No. 7,699,217 which claims the benefit of U.S. Provisional Application Ser. Nos. 60/712,477, filed Aug. 31, 2005 and 60/729,540 filed Oct. 25, 2005. All these patent applications are incorporated herein by reference.

BACKGROUND

Many human transactions involve strangers. They have never interact with each other before, thus need a way to verify that the persons they are interacting with are authorized to conduct the transactions. Most the time, physical identification documents issued by an authority are used as means to authenticate a person. Examples are driver licenses issued by the government, credit cards issued by a bank, and even business cards issued by a company. However, there are times when a person does not have possession of a physical identification document. Thus, it is important to develop a system to authenticate a person without the need to rely on physical identification documents.

BRIEF DESCRIPTION OF DRAWINGS

FIG. 3 shows an exemplary database of the present invention.

DETAILED DESCRIPTION

The present invention relates to authenticating a recipient so that a product can be delivered to an authorized person. The product can be commodity product (i.e., indistinguishable product available in a plurality of locations) or unique product. In order to simplify description, cash is used as an example of the product.

Figure 1A:
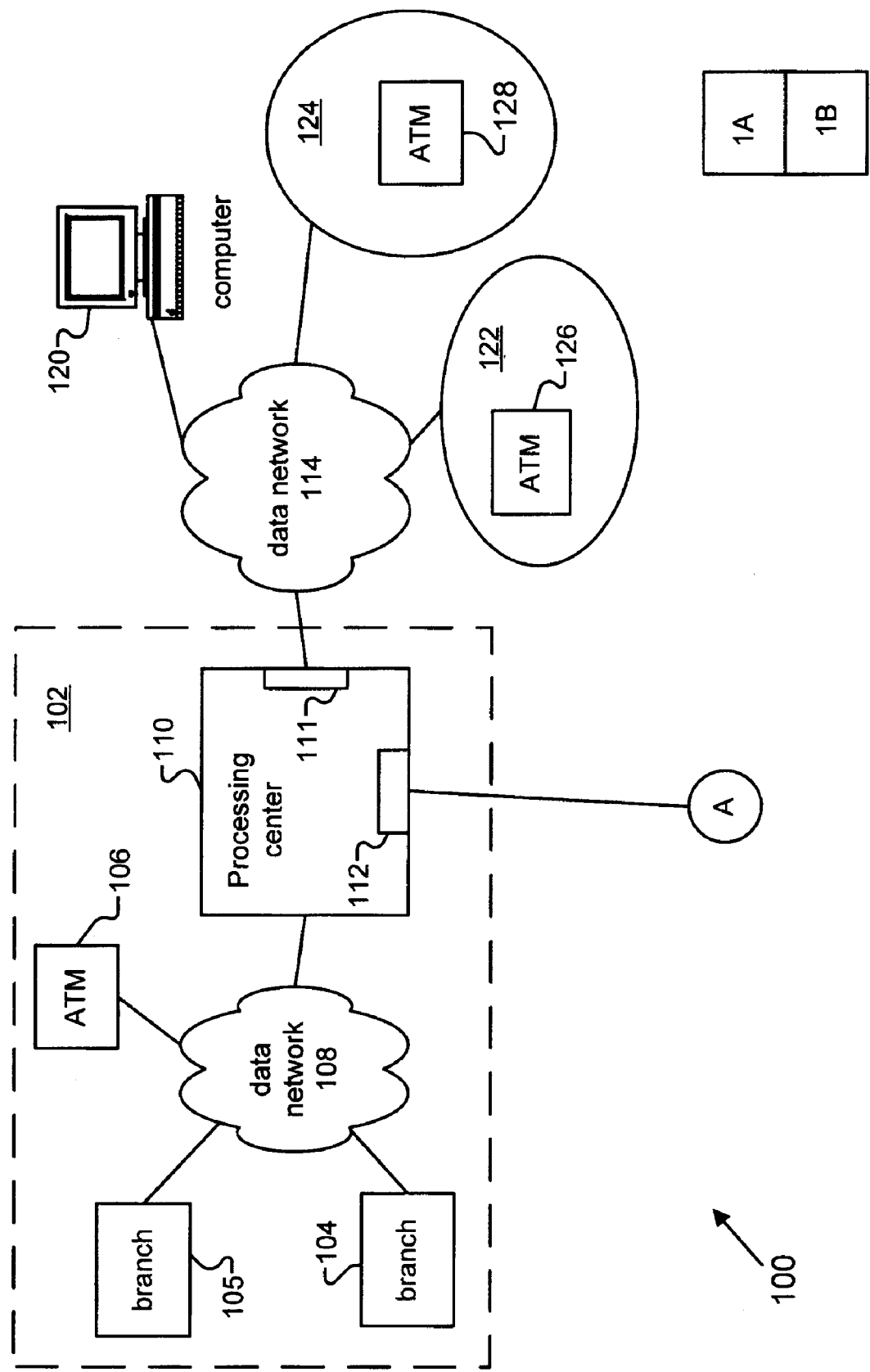
FIGS. 1A and 1B are block diagrams showing an exemplary system of the present invention.
Figure 1B:
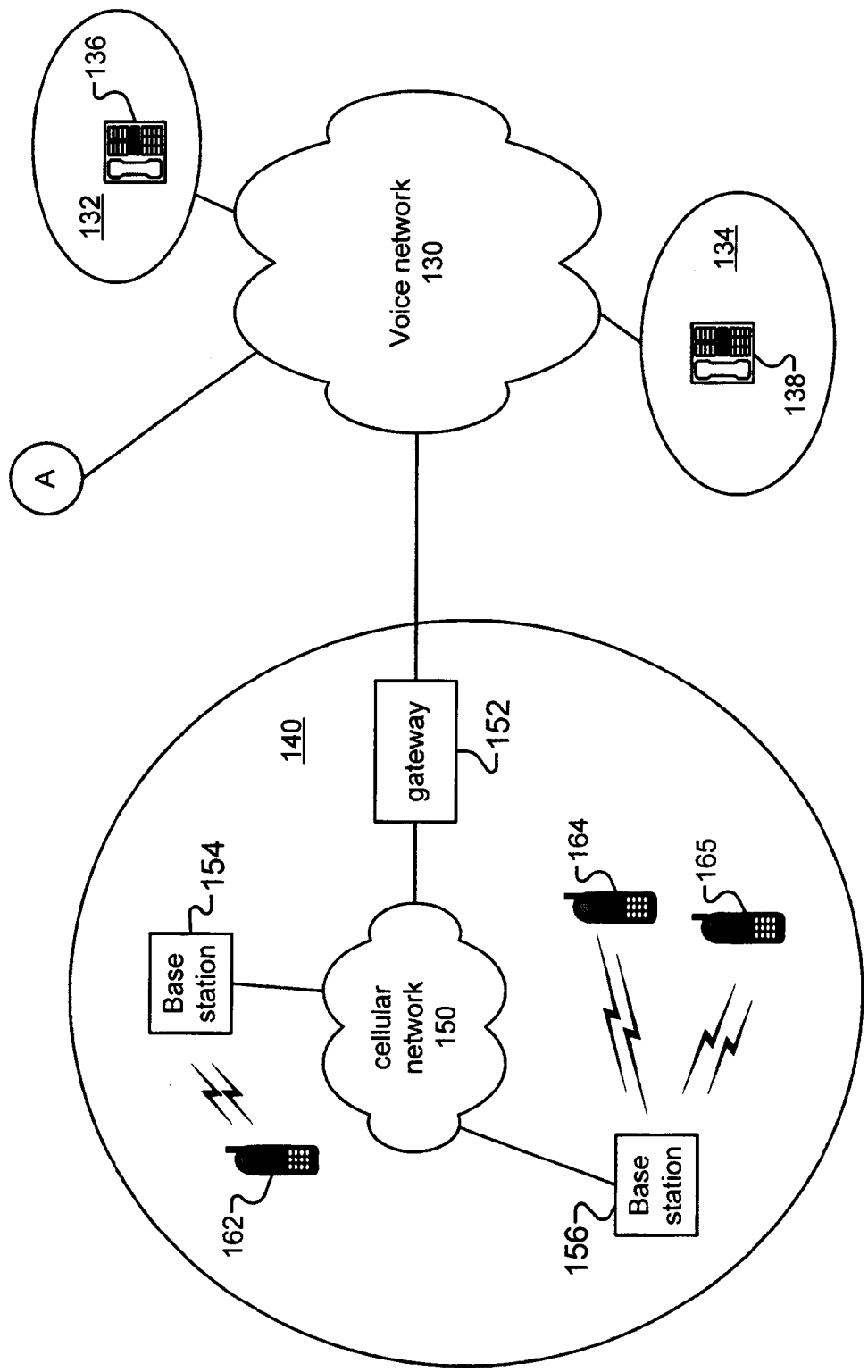

FIGS. 1A and 1B are block diagrams showing an exemplary system 100 of the present invention. It comprises a financial institution 102 (e.g., a bank) having a plurality of branch offices (e.g., branch offices 104 and 105), a plurality of automatic teller machines (ATMs), such as ATM 106, and one or more processing centers (such as center 110). These branch offices, ATMs and processing center can communicate with each other using a private data network 108. Private data network 180 may use a proprietary protocol for communication and is relatively secure.

Financial institution 102 can also communicate with a public data network 114 using a gateway 111. Through public data network 114, financial institution 102 can communicate with other data networks used by other financial institutions, such as institutions 122 and 124. These institutions can have their own ATMs (such ATMs 126 and 128), branch offices, processing centers and gateways. Financial institution 102 can also communicate with customers, such as a customer using a home computer 120, through public data network 114. An example of a public data network is the Internet Financial institute 102 can also communicate with a public voice network 130 (shown in FIG. 1B). Voice network 130 can be connected to various private voice networks maintained by different telephone companies, such as companies 132 and 134. Telephones (such as phones 136 and 138) in these voice networks can call processing center 110 of financial institution 102.

An example of a voice network maintained by a telephone company 140 is cellular network 150. Network 150 can communicate with public voice network 130 through a gateway 152. A number of base stations, such as base stations 154 and 156, are used to communicate with individual cellular phones. For example, base station 154 can communicate with cellular phone 162 and base station 156 can communicate with cellular phone 164-165. These cellular phones can communicate with processing center 110 of financial institution 102.

An example is used to illustrate one application of the present invention. A sender wants a recipient (who can be the sender himself/herself) to receive a product. However, the time the recipient wishes to retrieve the product is determined by the recipient. The present invention provides a method to authenticate the recipient without requiring the recipient to possess physical identification. After authentication, the recipient can retrieve the product.

One specific implementation of this example is that a person is traveling and wishes to retrieve money from an ATM or a bank when all his/her physical identification documents (e.g., ATM or credit cards, driver license, passport) are lost. The time the person needs to retrieve money under this example is unknown because it is difficult to predict when will the recipient lose his/her identification documents. In most cases, the person does not need to retrieve money using this embodiment because the chance of losing an ATM card is small. However, if the person has lost all documents in a remote location, the ability to retrieving money from a bank or ATM is extremely valuable.

Figure 2:
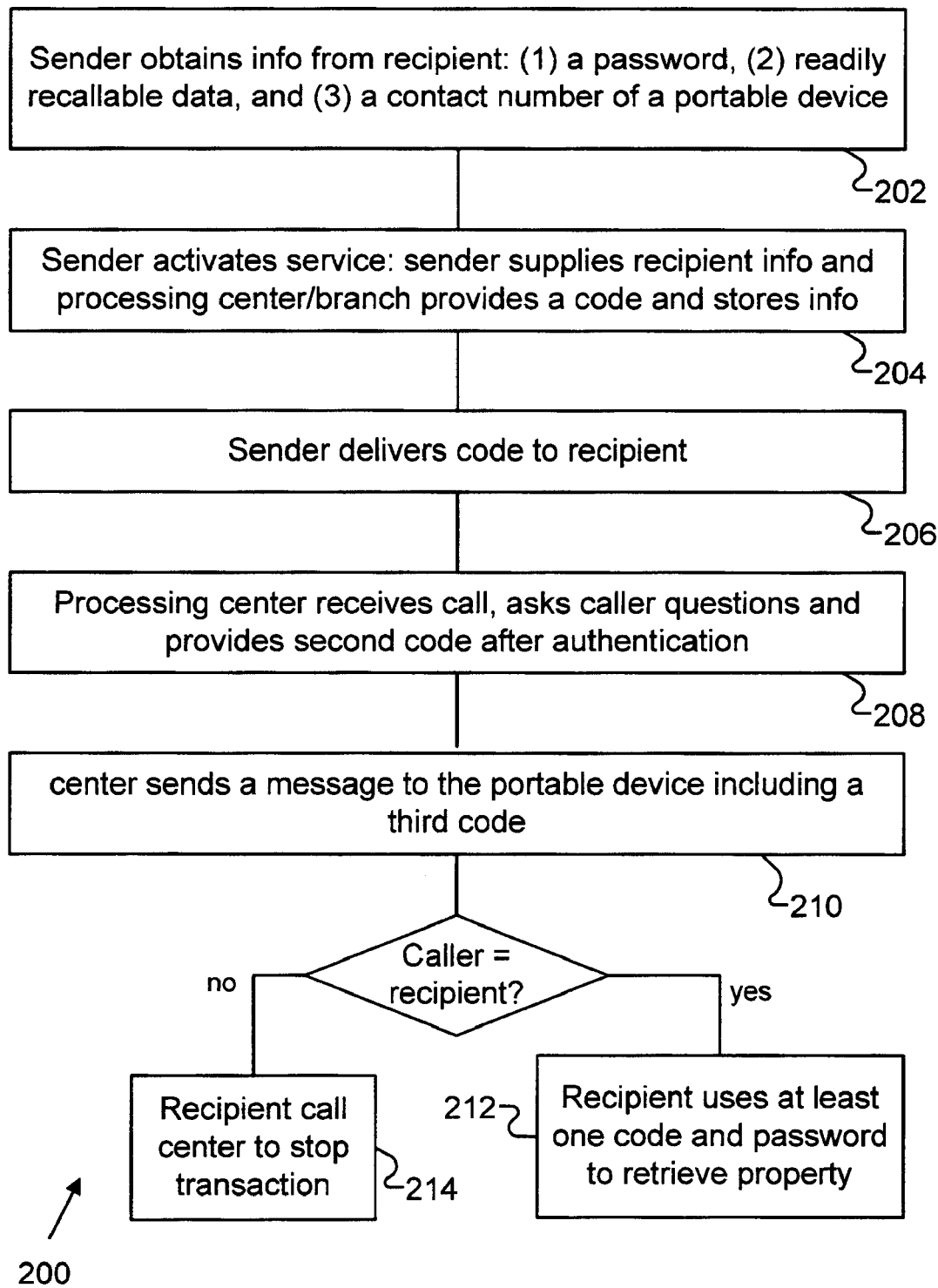
FIG. 2 is a flow chart showing an operation of the present invention.

FIG. 2 is a flow chart showing an operation 200 of this implementation. In step 202, the sender receives the following information from the recipient: (1) a password, (2) several pieces of readily recallable information, and (3) a contact number that allows communication with a frequently carried portable device (e.g., the telephone number of a cellular phone). The password and the pieces of readily recallable information should be kept confidential so that unauthorized persons cannot find out about them. In order to prevent others from knowing the readily recallable information, the information preferably does not appear on identification documents used in traveling (e.g., driver license, passport, etc.). Examples of readily recallable information are mother's maiden name, social security number, favorite food and place of birth.

If this sender is the same as the recipient, the sender himself/herself generates the password and pieces of readily recallable information.

The sender then contacts financial institution 102 to activate the service (step 204). The sender can achieve the activation by going to one of the branches (e.g., branches 104 or 105), calling a pre-assigned telephone number (which can be a phone number of processing center 110), sending a fax, or sending a request using home computer 120. The above mentioned information, i.e., password, pieces of readily recallable information and contact number, is supplied to financial institution 102. As part of the activation process, financial institution 102 gives a first code to the sender (note that another code from financial institution 102 is needed to retrieve money). The code can contain numbers, alphabets, or special characters. The sender can set money retrieval conditions, e.g., an expiration date of the service and payment in installments instead of a lump sum.

Financial institution 102 preferably stores the information in a database in processing center 110. However, the information can be stored in any convenient place in financial institution 102. An example of a database 250 and some of its fields are shown in FIG. 3. The first code is preferably set as the key to access individual records in the database. During activation, financial institution 102 gives the sender a telephone number for the recipient to call before money can be retrieved. This number can be a regular telephone number given to all bank customers or a telephone number dedicated for this purpose.

In step 206, the sender delivers the first code and the telephone number to the recipient. This step is not needed if the sender is also the recipient.

When the recipient is traveling, he/she can store the first code and the telephone in a number of places (e.g., luggage, handbag, wallet, car, etc.). As a result, even when most of the belongings of the recipient are lost, the recipient can still recover the first code and the telephone number. Alternatively, the recipient can call the sender to obtain the first code and the telephone number when there is a need to use the information. Although the first code is preferably kept confidential, it is not essential to do so because additional information is needed to retrieve money.

When the recipient needs to retrieve money (e.g., after his/her regular ATM card has been lost), the recipient calls the pre-assigned telephone number. Preferably, the telephone number connects the recipient to processing center 110. An agent of processing center 110 can ask the caller questions to confirm that the caller is the authorized recipient (step 208). The agent requests the first code from the caller and uses the first code to retrieve the information stored in the database during activation. The agent then asks the caller questions based on the readily recallable information. If the agent is convinced that the caller is the authorized recipient, processing center 110 updates the corresponding record to allow money to be retrieved by the recipient. For example, the agent can change the "status" field to "caller authenticated." Alternatively, the status can be "caller request denied" if the caller cannot provide the information to the satisfaction of the agent. If an unauthenticated caller has previously called, the agent should be more careful when receiving future calls (e.g., ask more questions or electronically record the call in case criminal investigation may be initiated in future).

In a preferred embodiment, the agent should be blocked from seeing at least one piece of information that is needed to retrieve money, such as the password. In this way, the security of the system is protected because the agent does not have all the information to retrieve the money. To reduce cost, the "agent" can also be an interactive voice response unit or similar automated devices instead of a live person.

Regardless of the result of the call (authentication confirmed or denied), processing center 110 sends a message to the contact number of the portable device of the recipient (step 210) about the call. This can be a voice message or a text message sent via short message service. Alternatively, the contact information can be an electronic mail address. In this case, the electronic mail is sent to an electronic mail server. A portable device, such as a device marketed under the "Blackberry" brand, a personal digital assistant (PDA) or even a notebook computer, can be used to retrieve the mail. If the call is authenticated, the message contains a second code. If the call is deemed to be from an unauthorized person, the message notifies the recipient that an unauthorized person has tried to retrieve money. This could prompt the recipient to take extra precautions. For example, if the recipient is near the end of his/her trip and decides that there is no need to retrieve money, the recipient can call the financial institution and terminate the service. After authenticating the recipient and checking the record to verify that an authorized person had previous attempted to obtain the second code, the financial institution can stop all persons (including the recipient) from retrieving money. In this case, the "status" field can be changed to "terminated."

If the caller is the authorized recipient, there is no need for the recipient to respond to the message containing the second code. The recipient can go to a branch of financial institution 102 or a participating ATM (e.g., ATMs 106, 126 and 128) to retrieve some or all of the money set at service activation. The ATM/branch requests the recipient to enter the second code and the password (step 212). In one embodiment, the ATM/branch can also ask the recipient to enter the first code. The ATM/branch sends the information to processing center 110 for verification. If there is a match, processing center 110 directs the ATM/branch to dispense money to the recipient. As a result, the recipient can retrieve money without any physical identification document (e.g., ATM card).

In another embodiment, the second code can be given to the recipient during the call to the agent. Preferably, processing center 110 still sends a message to the portable device mentioned in step 210. One advantage of sending the second code to recipient's portable device is that this process provides an additional authentication safeguard.

If the real recipient receives a message from the financial institution authorizing money retrieval (e.g., the recipient receives the second code) but he/she did not contact the financial institution, the recipient knows that an unauthorized person is trying to retrieve money from his account. The real recipient should act quickly to stop the transaction (step 214). In one embodiment, processing center 110 approves money dispensing only after waiting for a predetermined time interval after giving out the second code. This time interval can be set up by the sender during activation. This information can be stored as part of the "condition" field in the database. The recipient is made aware of the interval by the sender so that the recipient can act within the time interval. This embodiment gives the recipient a window of time to act without fear that the wrong person has already retrieved the money.

The recipient should call processing center 110 using his/her portable device to stop the transaction. In many cellular network, such as network 150, each cellular phone has a unique device identification. The base station of the network receives the device identification and the cellular network determines the telephone number associated with the cellular phone. This telephone number is sent to the receiving telephone network as a caller ID. When the recipient calls processing center 110 using his/her cellular phone, the telephone number of the device is delivered to processing center 110. This provides physical evidence that the caller is likely to be the true recipient.

After an agent in processing center 110 answers the call, the recipient informs the agent of the financial institution that he/she wanted to stop the transaction because the previous caller is an unauthorized person. The recipient supplies the first code and answers questions from the agent to confirm that this caller is the authorized recipient. The agent also checks the caller ID of the portable device to verify that the phone number is the same as the contact number provided during activation. Even though the previous caller appeared to be an authorized recipient, the stop order of this caller takes precedent because this caller is in possession of a physical device (cellular phone) that should belong to the authorized recipient. As a result, the previous transaction is cancelled. The agent can change the database to reflect the cancellation (e.g., change the "status" field to "previous authorization canceled"). The person who previously obtained the second code cannot use it to retrieve cash. In the embodiment in which the contact information is an electronic mail address, the recipient can send an electronic mail to processing center 110 and then followed by a telephone call.

In the above example, cash is a commodity and the recipient can go to any branch/ATM to retrieve cash. However, the present invention can be used to retrieve a unique product in a predetermined store (which may or may not be a financial institution). Similar to the steps described above, the recipient needs to receive the second code and then go to the predetermined store. The predetermined store releases the product after receiving the correct code and password.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A method for authenticating an authorized person, comprising:
   at a first time period:
      receiving from a first person a password, communication address and at least one piece of human generated information; and
      storing data in a storage, the data including the password, communication address and the at least one piece of human generated information;
   at a second time period that is subsequent to the first time period:
      receiving a telephone call from a caller;
      asking the caller questions using the data stored in the storage, the questions including the at least one piece of human generated information; and
      after receiving correct answers, transmitting the communication address to a communication network to deliver a code to a communication device; and
   at a third time period that is subsequent to the second time period:
      receiving the code and the password from an alleged authorized person;
      retrieving the data stored in the storage; and
      determining whether the alleged authorized person is the authorized person based on at least the code and the password;
   wherein the code is stored in the storage before the third time period.

2. The method of claim 1 wherein the communication address comprises an electronic mail address.

3. The method of claim 1 wherein the communication address comprises a telephone number.

4. The method of claim 1 wherein the communication device comprises a cellular phone.

5. The method of claim 1 wherein the transmitting the communication address to a communication network to deliver the code comprises wirelessly sending a message containing the code.

6. The method of claim 1 wherein the first person is same as the authorized person.

7. The method of claim 1 wherein the first person, the caller and the authorized person are the same person.

8. The method of claim 1 wherein the questions in the asking do not include asking for the password.

* * * * *